Dec. 2, 1952 W. C. HOWEY 2,620,403

WIRE RECORDING AND ERASING MEANS

Filed July 10, 1948

INVENTOR.

Walter C. Howey

BY Ezekiel Wolf his attorney

Patented Dec. 2, 1952 2,620,403

UNITED STATES PATENT OFFICE 2,620,403

WIRE RECORDING AND ERASING MEANS

Walter C. Howey, Demarest, N. J.

Application July 10, 1948, Serial No. 38,070

7 Claims. (Cl. 179—100.2)

The present invention relates to a wire recording system and more particularly to the method of erasing past history from a wire. By past history I mean recordings of sound whether in the form of speech, music, signals, code, or noise which by means of electromagnetic energy has impressed a magnetic record on a magnetic wire or tape, etc., and which still exists in part or in whole upon the wire tape, etc. at the time the erasing of it takes place. In the development of wire recording, which is generally conceded to have first been undertaken by Poulson some 50 years ago, the recording medium was a magnetic wire in which the maximum coercive force used was not greater than 40 to 50 oersteds. The wire then used was magnetized only slightly and it was comparatively simple to demagnetize for purposes of putting new records on it. As the magnetic properties of the wire were improved, so, also, higher magnetizing and coercive forces could be used, with the result that at the present time Armour Conference Standards provide that the maximum coercive force, when tested against an applied magnetizing field of 1000 oersteds, shall lie between 225 and 325 oersteds. With the consequent increase in the magnetizing forces which are used, a constant increase in the coercive magnetizing force is necessary, the coercivity being measured as the magnitude of the demagnetizing force in oersteds required to reduce the flux field to zero after a maximum magnetizing field has once been applied.

Various methods of erasure of past history have been tried. One of the earliest methods was to pass the wire over a direct current or permanent magnet and thereby magnetize the wire substantially uniformly over its whole length. This method of erasing provides obvious difficulties. In the first place, the wire is given a magnetic bias so that one-half of the new pulses or modulation applied to the wire tend to be eliminated. Another difficulty appears to be that considerable irregularity in magnetization actually results. This may be due to leakage flux, to non-uniform wire movement, to non-uniform wire or to a number of other causes.

In addition to this method of erasing, erasing with supersonic or high frequency oscillations has also been used. This is, perhaps, the current popular method of erasing magnetic history on wires. The results obtained with so-called "supersonic erasing" have been somewhat satisfactory, but in many cases where a strong signal has been put on the wire followed by later recording on the same part of the wire of weaker signals the successive signal on the background of the first signal shows up in the play-back of the second signal, even though the first signal has been subject to supersonic erase. Just what the cause of this effect is is not fully obvious. It is suspected, however, that the condition is brought about by the fact that as the wire leaves the demagnetizing or erase head a certain synchronism may be set up between the oscillations and the travel of the wire such that certain portions of the wire are magnetized rather than demagnetized. It is also true that with the use of a supersonic oscillation a steady state condition in magnetization and demagnetization is produced which results in a definitely impressed pattern on the wire.

I have found in the present invention that erasing of past history can be effectively accomplished by the use of rapidly repeated direct current pulses impressed upon the erase coil. These pulses are obtained either by half wave rectification of a part of the supersonic wave of perhaps 20 to 80 kc. or by full wave rectification of a part of the supersonic wave. These direct current pulses may be used independently or in conjunction with a supersonic oscillating erase current. It is believed that the reason for the success of the use of this type of current may be to provide a number of harmonic components of lower magnitude and higher frequencies than that of the main pulse itself in such a way that the lower magnitude background magnetization is completely erased along with the major magnetization of the wire by the supersonic wave and the direct current pulses.

In the present invention the supersonic bias frequency used to provide linear reproduction characteristics is partially rectified and used with supersonic bias waves to produce discrete current magnetic pulses which completely and effectively erase the past history on the wire just before it enters the sound head. The present method and system has been effective in permitting the use of wire or tape having double the coercive force fixed as allowable maximum by the Armour Foundation Conference (225 to 325 oersteds). It also permits the use of wire having less than one-half the high speed (two feet per second) fixed by the conference above mentioned.

The present invention is a continuation, in part, of my prior application 743,931, filed April 25, 1947, to the extent that a combined supersonic and direct current pulse is used for the erasing in the same manner that it is combined in the application referred to for recording. In the combined system for both erasing and recording, the recording and reproduction is enhanced in fidelity, frequency range and sensitivity while the linear amplification effect that would otherwise be lost in converting from sound to magnetic pulses and again reconverting to sound is preserved.

The system of the present invention is illustrated in the drawings describing the same in which.

Figures 1, 2, 3:
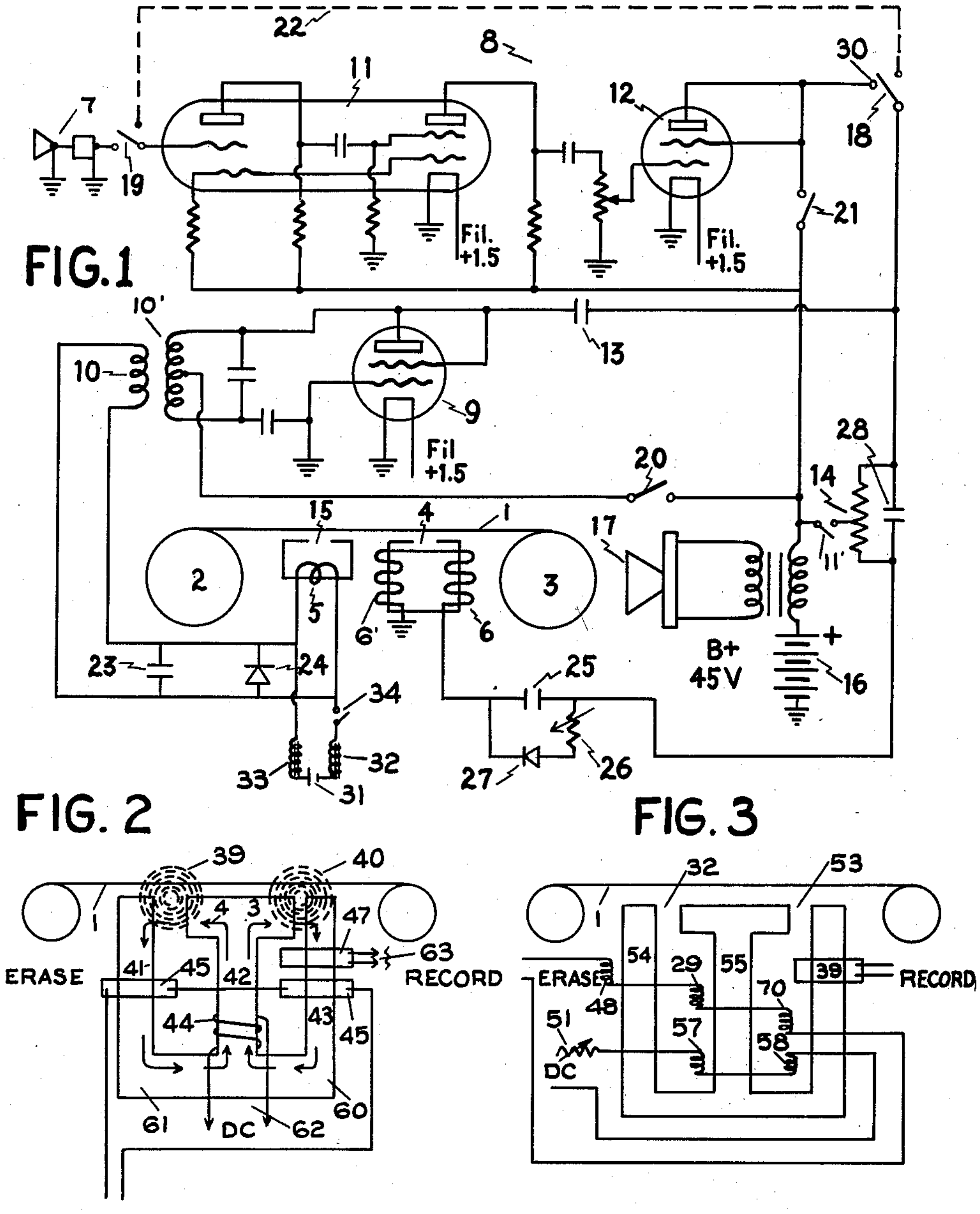
Figure 1 shows schematically the circuit diagram for the system.
Figure 2 shows diagrammatically the arrangement and excitation of the magnetic head.
Figure 3 shows a modification of the arrangement of Figure 2.

The recording system is generally that shown in my prior application mentioned above. Wire 1 may be reeled from spool 2 to spool 3 through the erasing gap 15 and the recording gap 4. Supersonic biasing current from the oscillator 9, which is a conventional oscillating unit well known in the art, is impressed upon the coil 6, of the recorder across the resonant capacitor 13 and the shunt connected resistance 14 and capacitor 28, as well as the capacitor 25. Audio frequency current from the microphone 7 and audio amplifier 8, which is a conventional high-gain hearing unit well known in the art, is introduced by direct coupling of the coil 6 through the amplifier tube 12 when the switch 18 is closed to the contact 30. Supersonic biasing oscillating frequency from the oscillator 9 may be in the range 20 kc. and 80 kc. The wire 1 may have a diameter of two to four mills. The supersonic biasing current when derived from miniature batteries and sub-miniature tubes is insufficient in itself to afford sufficient bias for audio frequency recording upon the straight line portion of the hysteresis loop. But with the combination of the polarizing biasing current it has proved to be more than sufficient to produce audible recording. Audio frequency waves from the amplifier 8, with variable frequency and amplitude produces the net rectified pulse polarization or magnetization of the wire as has been explained in the prior application above referred to.

The coil 6 is polarized from the battery 16 across the potentiometer 14 when the switch 11' is closed. The amount of polarization is controlled by the position of the potentiometer arm on the potentiometer 14.

The invention may also be used with large tubes and large power sources. The circuit shown may be used for reproduction by switching the input of the amplifier 8 from the microphone 7 to the electro-magnetic unit 6', switching the output of the amplifier 8 to the loud speaker 17 and disconnecting the oscillator 9, by opening the switch 20. Switches 18 and 19 at the extremities of connections 22, indicated by the dotted lines, should be closed to the upper position to accomplish this result. Switch 21 should also be closed to connect the speaker transformer for reproduction and switch 11' should, in this position, be open. All these switches mentioned above may be ganged together for a single operation.

Besides the introduction on to the wire 1, of polarizing current and supersonic current, an additional biasing pulse of supersonic repetition may also be impressed upon the wire if desired. This may be accomplished by the use of the resistor 26, and the rectifier 27, which may be of the germanium type connected in series with each other across the electrodes of the capacitor 25. With the use of this arrangement not only will the supersonic frequency be impressed as a bias upon the recording head but also the pulse bias at a supersonic rate is also used. This pulse may be adjusted in phase with one of the supersonic peaks or it may be adjusted out of phase to produce the most desirable effect. For erasing of previous history just before recording, or at any other time in fact, the erase head 15 is used. The coil 5 of the erase head is energized through the supersonic oscillator 9, which has in its output circuit the transformer 10' the secondary 10 of which serves as the input for the coil 5. This secondary 10 may be tuned by a capacitor 23 connected across it. A rectifier element 24 also of the germanium type is also shunted across the terminals of the secondary of the transformer, which, as shown, are directly connected to the coil 5. The result of this connection is to impress both a supersonic erase oscillation on the coil 5 in addition to a direct current pulse at a supersonic rate. Instead of using the rectifier 24 a small source of direct current, as from a battery, may be connected across the coil 5, as indicated at 31. The battery 31 should be connected with proper chokes 32 and 33 in the line to eliminate the high frequency from the battery circuit. A suitable switch 34 may be used to cut the battery in and out of the circuit when desired.

In the arrangement indicated in the Figure 2 the wire 1 moves past the record erase gap 39 and the recording—reproducing gap 40 from left to right in the figure. These gaps are formed in the highly permeable core 60 which has three legs, 41, 42, and 43 all branching from a single base 61. Direct current, which, for this purpose, may be only a few milliamperes in value, is fed from the D. C. input 62 to the coil 44 about the lower part of the central leg 42. This direct current propagates magnetic flux lines which divide, as shown by the arrows A and B, the arrow A following across the gap 39 and completing the magnetic circuit through the leg 41 to the base section 61. The other section of the common flux flows across the gap 40 and through the leg 43 at the base 61. Supersonic erase current, which may be a frequency from 20 to 80 kc. is impressed upon coils 45 and 46 which are shown in series but may also be in parallel and surround legs 41 and 43 respectively. The supersonic flux flowing across the gap 39 is used as erasing leakage flux in the air gap while the supersonic flux in the gap 40 has the effect of lowering the inductance in the core by operation of the magnetic iron above the bend in the hysteresis curve. The core may be made of a single thin lamination of metal of high permeability, as, for instance, the alloy of aluminum, nickel and copper commonly called "Alnico" or other such magnetic material known by the trade name of "Hyperloy." The operation of the magnetic circuit is substantially the same as previously explained insofar as the combination of the various components of alternating and direct current affect the magnetization of the core. The use of supersonic frequency of the same type on both the erase head and the recording reproducing head may be so phased as to produce desirable results in addition to the effect of lowering the impedance as previously explained. In addition to the coils previously mentioned, the second head section will, of course, also be provided with the record reproduce coil 47, whose terminals are connected to the proper amplifier over the lines 63.

In Figure 3 a method of magnetic pulse frequency doubling is shown wherein the erase signal may have its frequency doubled. In the diagrammatic sketch as shown erase coil 48 is on leg 54, erase coil 29 is on leg 55, and coil 70 is on leg 56. A direct current whose value is controlled by the resistor 51, energizes coils 57 on leg 55 and 58 on leg 56 in series. Direct current coils 57 and 58 are wound to propagate a direct magnetizing flux in legs 55 and 56 and a direct leakage flux into the air at the voice gap 53. Coils 29 and 70 are applied to the cores 55 and 56 in opposite phase and the direct current coils 57 and 58 are so wound that during one half of the alternating current cycle little flux variation occurs since the core is operating in the region of saturation. The result is that a double pulse frequency is produced in the same direction across the gap, that is a pulse for each half cycle which thereby doubles the frequency. Only a small amount of energy is necessary to supply the direct current which may be supplied from a dry cell or from a high resistance lead from B plus of an audio frequency amplifier or oscillator.

The double frequency pulse in this way can be produced in the record-reproduce gap 53 and in the erase gap 32. In the latter case the suspension coil 29 is 180° out of phase with the coil 48 and the direct current coil 57 will serve to cut out one half the wave so that pulses of the frequency of the half cycle will be produced which will double the supersonic frequency in the air gap 32.

I claim:

1. Means for erasing past history from a magnetic wire or tape including means for passing said wire through a magnetic field, means providing said magnetic field including means for continually energizing the field during the passage of the wire with magnetizing forces, said latter means comprising a constant direct current source and a constant oscillatory source of a frequency in the supersonic range, the magnetizing forces derived from said respective sources being supplied simultaneously.

2. Means as set forth in claim 1 in which the constant direct current source provides discrete magnetic pulses in the magnetizing field substantially in one direction only.

3. Means for erasing past history from a magnetic wire or tape including means for passing said wire through a magnetic field means for continually magnetizing said wire with components of direct current and oscillatory current of a supersonic frequency, said direct current component being of sufficient magnitude to substantially saturate the field during one half of the oscillatory current cycle whereby discrete magnetizing pulses are produced in one direction only for erasing the past history.

4. Means for erasing past history from a magnetic wire or tape including means for passing said wire through a magnetic field means for continually magnetizing said wire with components of direct current and oscillatory current of a supersonic frequency, said direct current component being of sufficient magnitude to substantially saturate the field during one half of the oscillatory current cycle and means producing an added component of high frequency current combined with the components previously set forth applied simultaneously to the magnetic field.

5. In a system for erasing of past history from a magnetic wire, magnetic core means of highly permeable material having an opening forming an air gap ranged longitudinally with the wire and closely adjacent thereto, coil means surrounding the core and means for impressing upon the coil means a supersonic oscillatory current, means for rectifying a portion of the supersonic oscillatory current and impressing the same as a direct current pulse upon the coil.

6. In a system for erasing of past history from a magnetic wire, a magnetic core of high permeable material having an opening forming an air gap ranged longitudinally with the wire and closely adjacent thereto, coil means surrounding the core and means for impressing upon the coil a supersonic oscillatory current, a rectifier crystal connected across the coil and a capacitor also connected across the coil for providing a rectified component of the frequency as a direct current pulse across the coil.

7. In a system for erasing of past history from a magnetic wire, magnetic core means of high permeable material having an opening forming an air gap ranged longitudinally with the wire and closely adjacent thereto, coil means surrounding the core and means for impressing upon the coil means a supersonic oscillatory current, means for rectifying a portion of the supersonic oscillatory current and impressing the same as a direct current pulse upon the coil and a direct current source connected to both sides of the coil through choke elements for providing a direct current component to the magnetic circuit.

WALTER C. HOWEY.

REFERENCES CITED

The following references are of record in the file of this patent:

UNITED STATES PATENTS

| Number | Name | Date |
|---|---|---|
| 1,886,616 | Alverson | Nov. 8, 1932 |
| 2,456,767 | Camras | Dec. 21, 1948 |

FOREIGN PATENTS

| Number | Country | Date |
|---|---|---|
| 874,773 | France | Aug. 26, 1942 |

OTHER REFERENCES

"Journal of The Institute of Electrical Communication Engineers," Japanese Pub. #180, March 1938, pages 144–148.